United States Patent [19]

Rebman

[11] Patent Number: 4,800,802
[45] Date of Patent: Jan. 31, 1989

[54] HYDRAULIC REMOTE CENTER COMPLIANCE DEVICE

[75] Inventor: Jack Rebman, Cary, N.C.

[73] Assignee: Lord Corporation, Erie, Pa.

[21] Appl. No.: 84,396

[22] Filed: Aug. 11, 1987

[51] Int. Cl.$^4$ .............................................. F01B 1/02
[52] U.S. Cl. .............................................. 92/61; 92/146; 92/161; 901/45; 33/644; 279/16
[58] Field of Search ............. 92/64, 61, 161, 165 R, 92/146; 91/517, 518, 390; 901/45; 33/52, 644, 169 C; 279/16, 17; 408/127; 364/182

[56] References Cited

U.S. PATENT DOCUMENTS

| | | | |
|---|---|---|---|
| Re. 31,999 | 10/1985 | Rebman | 33/185 R |
| 4,276,697 | 7/1981 | Drake et al. | 33/644 |
| 4,355,469 | 10/1982 | Nevins et al. | 33/169 C |
| 4,367,591 | 1/1983 | Hirabayashi et al. | 33/169 C |
| 4,400,885 | 8/1983 | Consales et al. | 33/169 C |
| 4,429,463 | 2/1984 | Angell | 33/169 C |
| 4,440,031 | 4/1984 | De Fazio | 33/169 C |
| 4,458,424 | 7/1984 | Cutkosky et al. | 33/185 R |
| 4,485,562 | 12/1984 | De Fazio | 33/169 C |
| 4,517,744 | 5/1985 | Consales et al. | 33/169 C |
| 4,537,557 | 8/1985 | Whitney | 901/45 |
| 4,571,148 | 2/1986 | Drazan | 414/730 |
| 4,595,334 | 6/1986 | Sharon | 901/45 |
| 4,661,037 | 4/1987 | Sugino et al. | 33/169 C |
| 4,672,741 | 6/1987 | Zafred et al. | 33/286 |
| 4,694,230 | 9/1987 | Siocum et al. | 364/182 |

FOREIGN PATENT DOCUMENTS 2152473 8/1985 United Kingdom ............. 33/169 C

OTHER PUBLICATIONS

Robotic Assy: H. S. Cho, H. J. Warnecke, D. G. Gweon, 4/28/87.

Primary Examiner—Robert E. Garrett
Assistant Examiner—Thomas Denion
Attorney, Agent, or Firm—Bell, Seltzer, Park & Gibson

[57] ABSTRACT

The device has primary and secondary frame members interconnected by extensible and retractable positioning members connected by fluid circuits that cause extension of the member at either end of a circuit in response to retraction of the member at the other end of the circuit. Relative movements of the positioning members occur in response to the imposition of forces and moments at the projected center of compliance upon a pin or the like supported by the secondary frame member, and so adjust the position of the secondary frame member as to cause translatory and rotative movement of the supported pin.

13 Claims, 4 Drawing Sheets

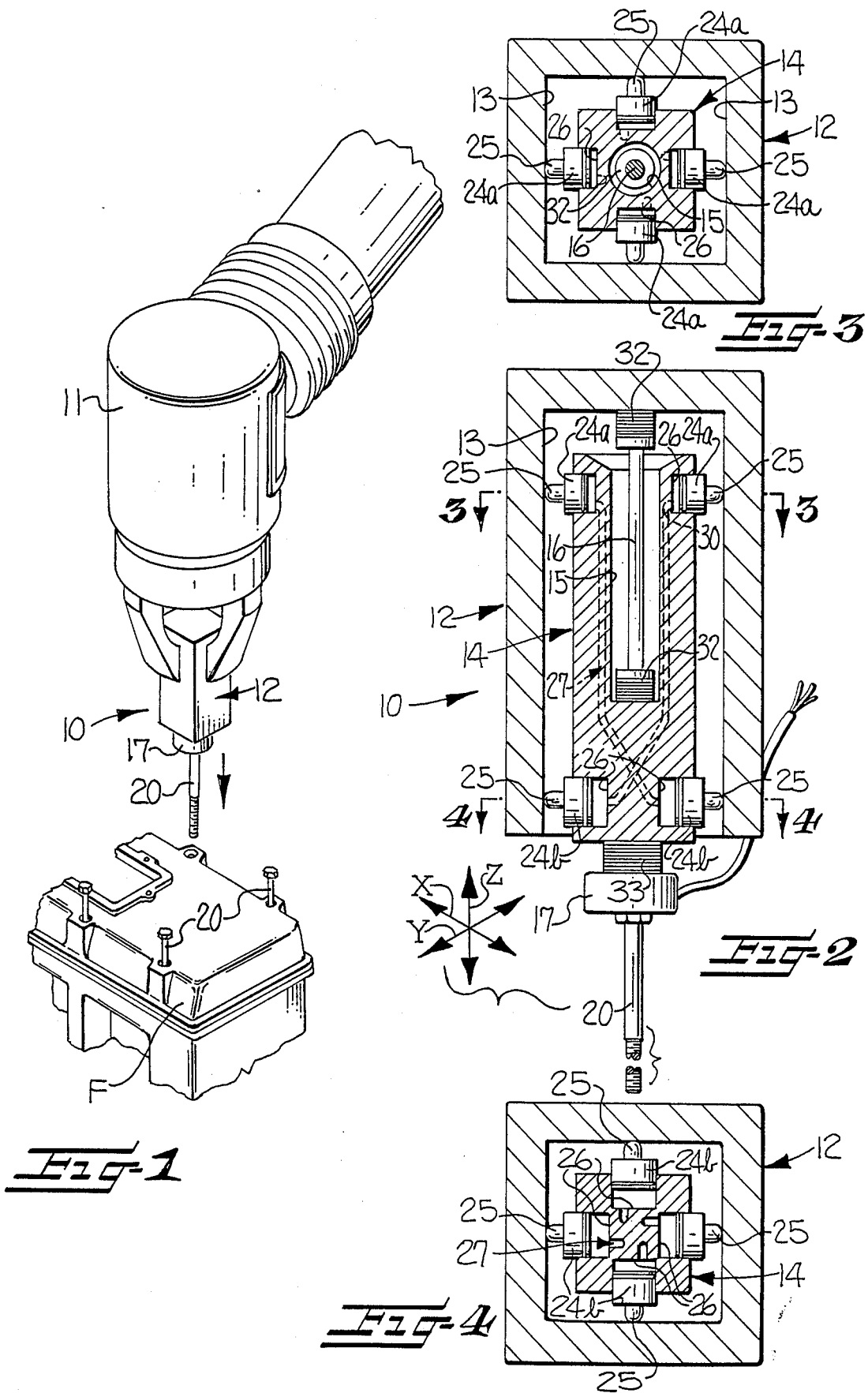

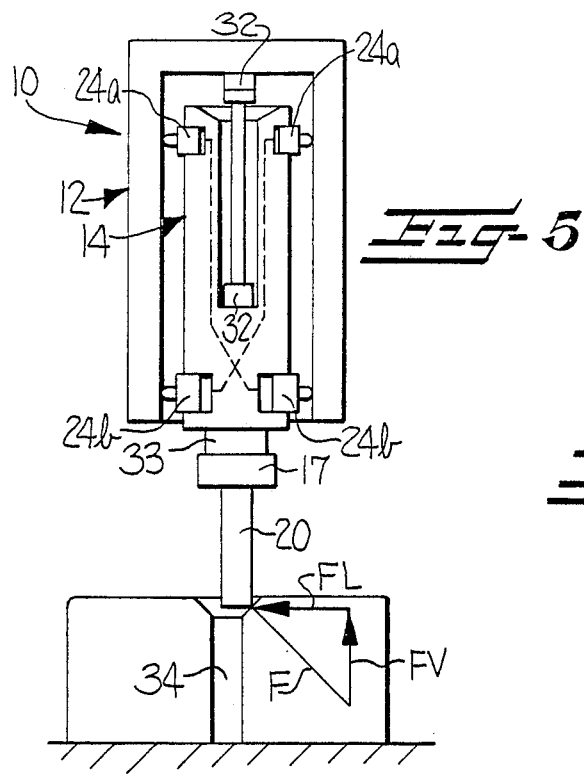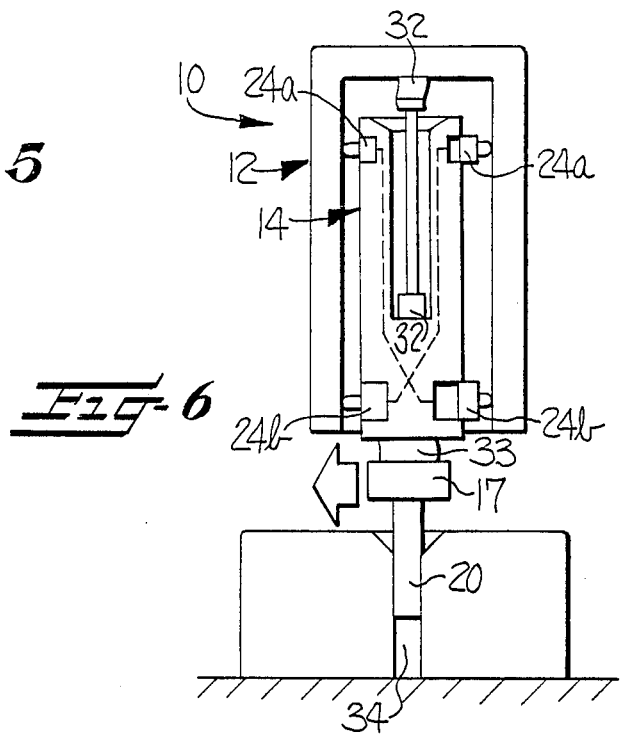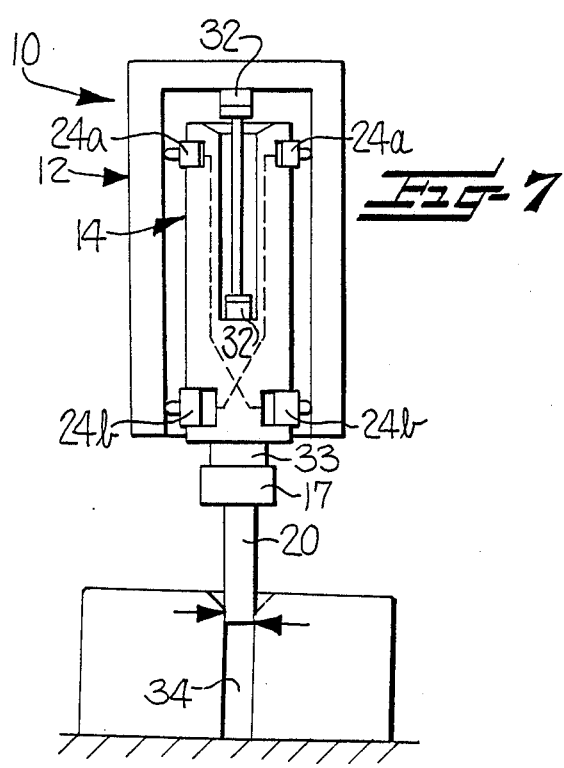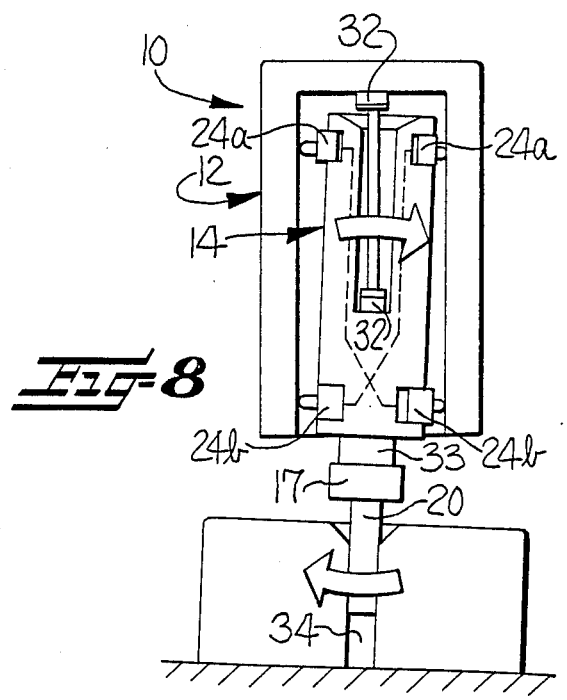

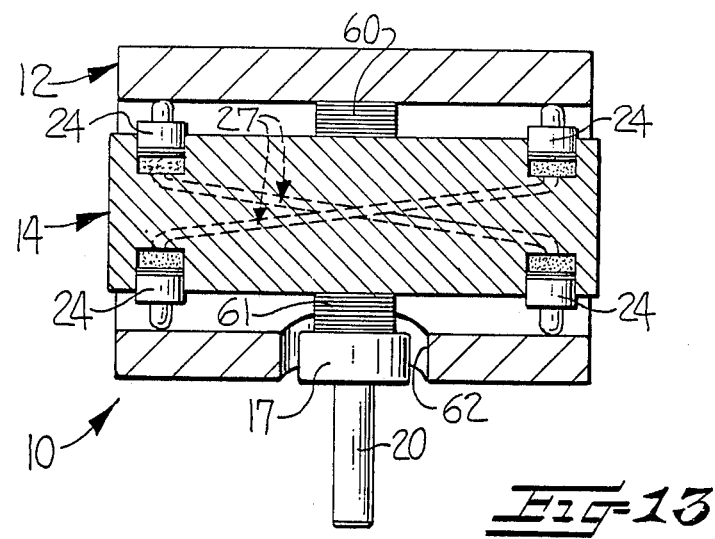
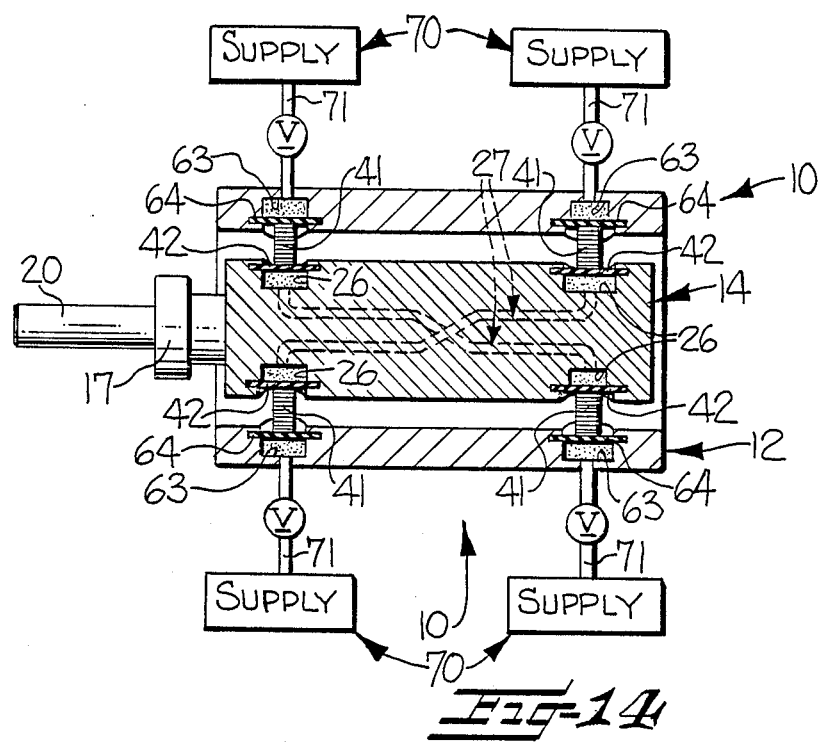

HYDRAULIC REMOTE CENTER COMPLIANCE DEVICE

FIELD OF THE INVENTION

This invention relates to remote center compliance devices such as are useful for, among other things, facilitating interconnection of mating male and female parts during an assembly operation. The invention more specifically relates to an improved remote center compliance device that utilizes passive hydraulic circuit means in its operation.

BACKGROUND OF THE INVENTION

As is well known to those skilled in the art, a remote center compliance (RCC) device supports a part, or other member to be positioned, for adjustive translatory and/or rotational movement about a center of compliance, disposed distal from the device itself, in response to forces and/or moments imposed upon the supported member at the remote center. Although capable of various other utilizations, RCC devices frequently are employed to compensate for misalignment between mating parts that are to be interconnected during an assembly or similar operation performed by a robot or other automatic machine.

In their most commonplace form, RCC devices consist of primary and secondary frame members interconnected by a plurality of angularly extending or "focalized" compliant members, and their projected centers are incapable of positional adjustment. Another type of RCC device, disclosed in U.S. Pat. No. 31,999, may be constructed so as to possess a long slender configuration, as opposed to the relatively bulky construction of the focalized devices, and further may be adjusted so to vary the location of the remote center projected by the device. In contrast to these RCC devices of purely mechanical types, it has also been proposed to provide misalignment compensating devices, albeit not necessarily ones that project a remote center of compliance, that employ fluid means in their operation. For example, U.S. Pat. No. 4,458,424 discloses the use, in what is basically an RCC device of the bulky mechanical "focalized" kind, of fluid-filled elastomeric spheres in lieu of solid elastomeric elements as the connectors between the primary and secondary frame members. By varying the pressure within individual ones of the spheres, the location of the remote center may be varied, and compensation may be made for the "sag" undergone by the device when it is used in a horizontal orientation. U.S. Pat. No. 4,571,148 discloses a positioning device having actuators operable by compressed air or other gas whose flow is actively controlled in response to sensed displacements of a device component. As is recognized in the patent itself, the "active" device of the patent differs greatly from conventional RCC devices that do not require any sensing means to detect misalignments, nor any motors or other actuators to compensate for them.

SUMMARY OF THE INVENTION

The present invention provides a RCC device possessing advantageous features of various of the above-discussed prior-art devices, while being free from various disadvantageous features thereof. Thus, while the device of the present invention contains hydraulic or similar fluid, and may in certain embodiments be readily adjusted to change the location of the projected remote center of compliance and/or to prevent undesirable "sag" when used in a non-vertical orientation, the device does not employ a bulky "focalized" construction and may possess a long slender configuration. Additionally, while the device of the present invention can include "active" as well as passive fluid means, it also can be of a purely passive type free from expensive position sensors, actuators and similar components requiring extraneous power sources.

The device of the invention has, as is customary, interconnecting means connecting a secondary frame member to a primary frame member for gross movement with the primary member and for limited translational and rotational adjustive movement relative to the primary member. In addition to compliant means, the interconnecting means includes a plurality of first and second extensible and retractable positioning members carried by the secondary frame member and projecting from opposite sides thereof into engagement with the primary frame member. The first and second positioning members are respectively located at first and second locations spaced from each other along the length of the secondary frame member. The device further includes a plurality of fluid circuit means. Each circuit means interconnects one of the first positioning members upon one side of the secondary support member and one of the second supporting members upon an opposite side of the support member, such that retraction of either of the positioning members causes extension of the other of the members.

BRIEF DESCRIPTION OF THE DRAWINGS

Other features of the invention will be apparent from the following description of illustrative embodiments thereof, in which:

FIG. 1 is a perspective view showing a remote center compliance device in accordance with the invention, being used in association with a robot arm or the like for a parts assembly operation;

FIG. 2 is a longitudinal sectional view taken through the device shown in FIG. 1;

FIGS. 3 and 4 are transverse sections respectively taken along the lines 3—3 and 4—4 through the device of FIG. 2;

FIGS. 5 and 6 are partially schematic views illustrating compensation by the device for lateral misalignment between the axes of mating male and female parts;

FIGS. 7 and 8 are partially schematic views illustrating compensation by the device for angular misalignment between the axes of mating male and female parts; and FIGS. 9, 10, 11, 12, 13 and 14 are longitudinal sectional views of second, third, fourth, fifth, sixth and seventh additional embodiments of the device.

DESCRIPTION OF THE PREFERRED EMBODIMENTS

Figure 9:
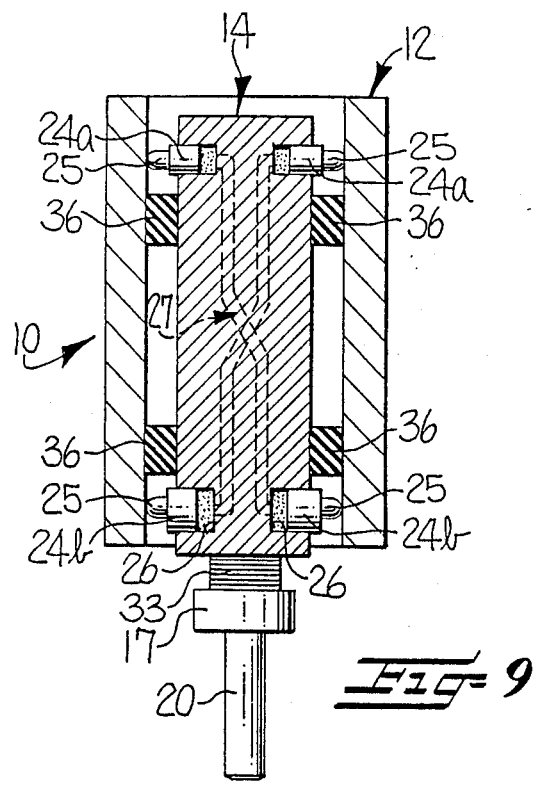

The numeral 10 in FIG. 1 of the drawings designates a remote center compliance device being used by an industrial robot 11, which is only fragmentarily shown, engaged in an assembly operation involving the insertion of cylindrical pins 20 into mating chamfered bores of a part such as a filter frame F. When used in such an operation, the conventional purpose of device 10 is to eliminate lateral and/or angular misalignments that might exist between the central axis of each pin 20 and the bore within which it is received. While such misalignments may be quite small, e.g., a few thousandths of an inch, they may if uncorrected result in jamming or wedging of the mating parts with resulting failure of the assembly operation and possible damage to the parts and/or to robot 11.

Referring now also to FIGS. 2–4 of the drawings, device 10 includes elongate primary or outer and secondary or inner frame means 12, 14, respectively. Outer frame 12, which has an interior chamber 13 opening from its lower (in the orientation thereof viewed in FIG. 2) end, is adapted to be supported and moved by robot 11 or some comparable support member during use of device 10. Inner frame 14 is received within chamber 13 of frame 12, and projects from its open lower end. A chamber or cavity 15 extends centrally of frame 14 and opens from its upper end. A compliant resilient member 33, which illustratively is a laminate of alternating layers of elastomeric material and rigid material, connects the closed lower end of secondary frame 14 to a chuck 17 or other support means for grasping and supporting the pins 20 or other parts handled by device 10 during use thereof. While chuck 17 is illustratively of an electromagnetic type, the support means might be of some other type.

Inner frame 14 is connected to outer frame 12, by interconnecting means to be now described, for gross movement in unison with the outer frame and for limited movement relative to it along three orthogonal axes, such as the axes X, Y and Z of FIG. 2. The aforesaid interconnecting means includes a compliant linkage 16 illustratively comprised of a pair of compliant members 32 bonded or otherwise suitably secured to respective ones of the closed ends of the interior chambers 13, 15 of frame members 12, 14, and to the opposite ends of an elongate rigid rod or the like extending therebetween. Members 32 may be of the same composite laminate type as previously described composite member 33. Linkage 16 reacts loads in the axial or vertical (in the illustrated orientation of device 10) direction. The linkage is relatively stiff in such direction, and relatively soft or flexible laterally and rotationally.

In addition to linkage 16, the means interconnecting outer and inner frames 12, 14 includes a plurality of extensible and retractable first and second positioning members 24a, 24b, respectively, and hydraulic circuit means that interconnect each one of the first positioning members 24a with a respective one of the second positioning members 24b. The positioning members 24a, 24b are carried by inner frame 14 and project outwardly from each of the four sides thereof into engagement with respective ones of the four confronting sides of chamber 13 of outer frame 12. Each positioning member 24a, 24b lies upon the longitudinal center line of the side of frame 14 from which it projects, and is spaced along the length thereof from the other of the positioning members. The first positioning members 24a, which in the illustrated vertical orientation of device 10 are the uppermost ones, lie in a common horizontal plane and those upon opposite sides of frame 14 are axially aligned with each other. The second (lowermost in FIG. 2) positioning members 24b similarly lie in a common plane, and opposite ones of them are axially aligned. The cylindrical main body portions of members 24a, 24b are slidably received within respective ones of a plurality of fluid chambers 26 extending into and opening from the ides of frame 14. Suitable seals (not shown) prevent leakage of fluid from between the confronting cylindrical surfaces of each member 24a or 24b and its associated chamber 26. All of the members 24a have the same effective "piston area," i.e., the area thereof that is exposed to the pressure of the fluid within its associated chamber 26. All of the positioning members 24b similarly have the same effective piston area, but this is greater than the effective piston area of members 24a by a preselected amount. Each member 24a, 24b also has a rounded outer end portion 25 that is integral with its main body portion and that slidably engages the confronting one of the side walls of chamber 13 of primary frame 12.

Fluid chambers 26 form part of hydraulic circuit means that further includes four elongate fluid passageways 27 within secondary frame 14. Each passageway 27 interconnects the fluid chamber 26 of one of the upper positioning members 24a and the fluid chamber 26 of the lower positioning member 24b upon the opposite side of frame 14. The passageways 27 and the chambers 26 at opposite ends thereof are filled with fluid, which preferably is an incompressible hydraulic fluid.. Consequently, retractive movement of either of the positioning members 24a, 24b at opposite ends of each one of passageways 27 causes substantially simultaneous extension-type movement of the other of the positioning members. The aforesaid simultaneous reverse movements of each interconnected pair of members 24a, 24b are of different magnitudes due to their effective piston areas being different. More specifically, since the effective piston area of each upper positioning member 24a is less than the effective piston area of each lower member 24b, retraction of a given magnitude of a member 24b produces greater magnitude extension of the thereto hydraulically connected member 24a upon the opposite side of frame 14. Similarly, retraction of a positioning member 24a produces extension to a lesser extent of the member 24b hydraulically connected thereto. Movement in extension and/or retraction of each member 24a, 24b is of course only in relation to inner frame 14: the outer end of each member remains in engagement with the adjacent wall of outer frame 12.

Device 10 is capable of projecting a remote center of compliance at a preselected location adjacent the free outer (lower in the illustrated orientation of the device) of the pin 20 carried by its chuck 17. The precise location of the center of compliance is dependent upon, and may be varied by modification of, a number of factors that include the stiffnesses of the compliances 32, 33, the relative distances along the central axis of the device between its positioning members and its various compliant members, and the difference in the effective piston areas of the positioning members 24a and 24b. When the remote center of compliance of device 10 is located at the lower end of pin 20, then by definition a pure force imposed upon its lower end will produce pure translation of the bolt, and a pure moment or couple will produce pure rotation of the pin about the remote center. FIGS. 5–8 illustrate the foregoing results in an assembly operation wherein device 10 is being used by a robot or the like (not shown, but such as the robot 11 of FIG. 1) to facilitate insertion of pin 20 into a bore 34 having a chamfered upper end.

In the situation depicted in FIG. 5, the longitudinal axes of pin 20 and bore 34 are laterally misaligned. Consequently, as device 10 is moved vertically downwardly, the lower end of pin 20 engages the chamfer at the upper end of bore 34, rather than passing freely into the bore. The components of the force F imposed upon the lower end of pin as a result of such engagement include a vertical force FV and a leftwardly directed lateral force FL. The force FL upon the lower end of pin 20 pivots or rotates the pin in a clockwise direction, displacing the pin's lower end leftwardly about a center of rotation within compliant member 33. At the same time force FL displaces the lower end portion of frame 14 leftwardly, causing retraction of the lower left positioning member 24b of FIG. 5. The ensuing displacement of fluid in the hydraulic circuit interconnecting the lower left positioning member 24b and the upper right positioning member 24a causes the latter member to undergo greater magnitude extension. This causes leftward displacement of the upper end portion of frame 14 and retraction of upper left positioning member 24a. Displacement of fluid within the hydraulic circuit interconnecting the aforesaid member 24a and lower right member 24b then effects lesser magnitude extension of member 24b. The overall result of the foregoing is that inner frame 18 undergoes pivotal or rotative movement in a counterclockwise direction about the center of rotation disposed below pin 20, which displaces the upper end of the pin to the left. When the leftward displacement of the upper pin end due to rotation of frame 14 equals the leftward displacement of the pin's lower end, caused by rotation of pin 20 about a center in compliance 33, pin 20 undergoes leftward translatory movement until it is aligned by and received within bore 34, as shown in FIG. 6. Realization of the foregoing result is of course dependent upon device 10 being properly designed and constructed from the viewpoint of compliance stiffnesses, component spacings, positioning member relative piston areas, etc.

FIG. 7 illustrates correction by device 10 of angular, rather than lateral, misalignment between the axes of pin 20 and bore 34. The illustrated angular misalignment causes a clockwise moment or couple to be imposed upon the lower end portion of pin 20. As is indicated in FIG. 8, such moment causes, in conjunction with the interaction of positioning members 24a, 24b, clockwise rotation of frame member 14 about the center of rotation located adjacent the lower end of pin 20. The moment of couple also causes rotation of pin 20 relative to the frame 14 in a clockwise direction, about the center of compliance 33. In conjunction with each other the aforesaid two angular deflections result in pure rotation of pin 20 about the center of compliance located adjacent its lower end, such that it becomes aligned with and can descend freely into bore 34.

It will be appreciated that the angular deflections of components illustrated in FIGS. 6-8 are exaggerated for clarity of illustration.

In FIGS. 9-14 of the drawings, which illustrate other embodiments of device 10, components identical or similar to those in the first or some other preceding embodiment are designated by the same reference numerals.

In the embodiment of FIG. 9, the central link 16 of the first embodiment has been replaced with compliant elements 36, formed of blocks of elastomeric material, that extend between and are bonded or otherwise suitably secured to confronting faces of frames 12, 14. This allows elimination of the closed end of frame 12, and of the central cavity of frame 14.

Figure 10:
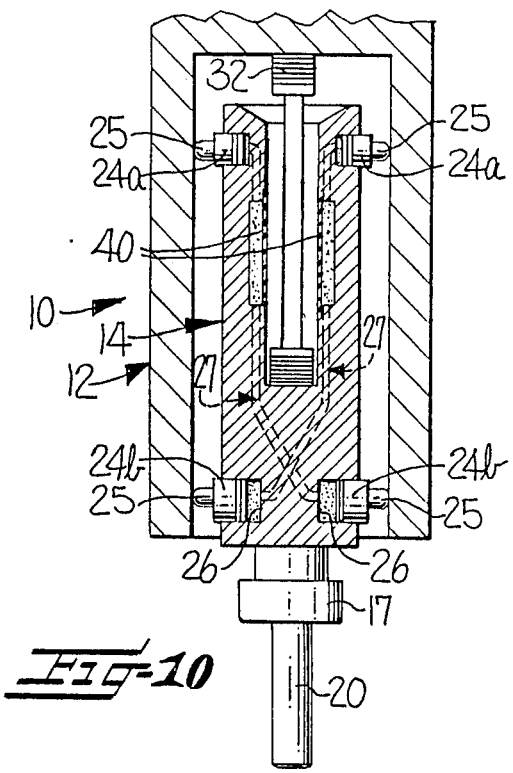

The embodiment of FIG. 10 does not have the compliant member 33 used in the device of the first embodiment to resiliently interconnect chuck 17 and frame 14. Instead, such components are rigidly connected and additional compliant members 40 are provided to provide device 10 with the additional degree of freedom of movement necessary for successful operation thereof. Compliances 40, which are formed of elastomeric or other resilient material that will flex or bulge which subject to fluid pressure, constitute boundaries of the central sections of respective ones of the hydraulic fluid passageways 27. Each compliance has one surface that constitutes a boundary of its associated passageway, and an opposite surface that confronts interior chamber 15 of frame member 14.

In the embodiment of FIG. 10, the relative displacements of positioning members 24a, 24b are no longer a function of only their relative effective piston areas, but rather are also a function of the characteristics of compliant members 40. By utilizing members 40 of differing stiffness, the amount of compliance in the hydraulic system of device 10 can be modified as desired. While it is also possible to achieve compliance in the hydraulic system of device 10 through the use therein of compressible fluid, rather than noncompressible fluid, the use of compressible fluid makes it more difficult to control the operation of the device and thus is less desirable.

Figure 11:
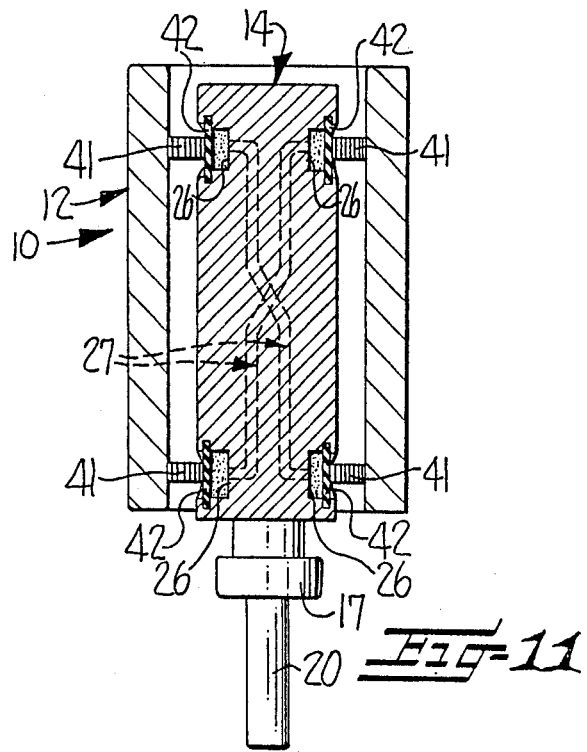

In the device 10 of FIG. 11, the positioning members 24 of the first embodiment are replaced by extensible and retractable positioning members 42 that are of resilient compliant construction, and that have pin-like members 41 in association therewith. Members 42 are bonded or otherwise affixed to inner frame 14 adjacent respective ones of its fluid chambers 26, and constitute closures for the outer openings of such chambers. The outer face of each positioning member 42 engages the inner end of the associated one of the pins 41. The outer end of each pin 41 engages the thereto adjacent one of the inner walls of outer frame 12. Each pin 41 is bonded or otherwise secured to at least the wall or the member 42 that it engages, and may be secured to both. Sliding movement of pins 41 with respect to such walls is not necessary, since the compliant positioning members 42 permit relative angular displacement, as well as horizontal and vertical displacement, between frame members 12, 14. When the outer ends of the pins 41 are fixedly secured to the adjacent members 42 and the walls of outer frame 12, there is no necessity for additional supportive compliant means such as designated by the numeral 32 in the first embodiment and by the numeral 36 in the FIG. 9 embodiment. Since members 42 also impart some compliance to the hydraulic system of device 10, in some instances it may also be possible to eliminate, as in the FIG. 10 embodiment, the compliant connection between chuck 17 and frame 14. Use of the members 41, 42 of FIG. 11 in lieu of the sliding positioning members 24 of the FIG. 1 embodiment also reduces if not altogether eliminates possible leakage and wear problems, and simplifies manufacture and assembly.

Figure 12:
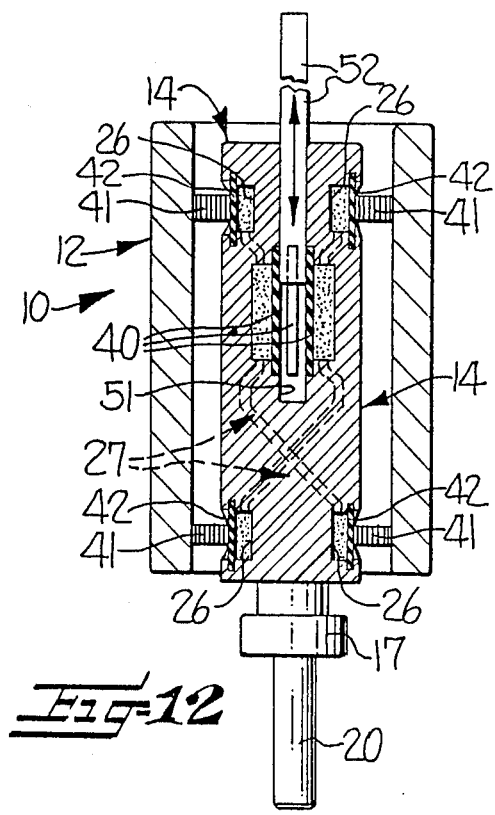

The embodiment of FIG. 12 employs members 41, 42 such as in the FIG. 11 embodiment, in association with compliant members 40, such as used in the FIG. 10 embodiment, that add additional compliance to the hydraulic system. The device 10 of FIG. 12 further includes means for conveniently adjusting the compliance of the device's hydraulic system. Such means illustratively consists of a rod-like member 52 that projects into and is adjustably movable longitudinally of central cavity 15 of device 10. When occupying an extreme upward position, rod 52 is spaced above the elevation of the compliant members 40 disposed between cavity 15 and respective ones of the fluid passageways 27. Member 52 then permits full flexure or bulging of members 40 into cavity 15, as a result of which the overall compliance of the hydraulic system is then relatively high. When moved downwardly to a position wherein it overlies all of the normally "free" central sections of members 40, member 52 then impedes flexure or bulging of members 40 into cavity 15, as a result of which the system compliance is relatively small. By locating rod 52 at any desired intermediate position, the system compliance can be made of any desired intermediate value. The foregoing capability is desirable since it permits the exact location of the remote center of compliance of device 10 to be adjusted quickly and easily when, for instance, there is a change in the length of the bolts 20 or other parts being positioned by the device.

Adjustment of the axial position of rod 52 may be effected either manually or by means of a suitable position-adjusting mechanism (not shown) associated therewith.

It will be appreciated that in each of the embodiments of FIGS. 10–12, wherein chuck 17 is rigidly connected to the lower end of frame 14, there will not be any relative lateral or rotative movement between frame 14, on the one hand, and chuck 17 or pin 20 on the other hand. Instead, when a force or moment is applied to pin 20 at the projected remote center of compliance of the device, pin 20 and frame 14 will move in unison with each other. This simplifies to some extent the design and operation of the device.

In contrast to the long slender configurations of the devices of the preceding embodiments, the device 14 of the FIG. 13 embodiment is relatively short and wide, which configuration may be desirable for certain utilizations due to particular spacial limitations. The means interconnecting inner and outer frames 12, 14 includes, in addition to extensible and retractable positioning members 24, a compliant member 60 secured to an inner side wall of frame 12 and to a confronting outer side wall of frame 14. Chuck 17 and the bolt 20 supported by it are connected to frame 14 by a compliant member 61 disposed on the opposite side of member 14. The chuck projects through an opening 62 within outer frame 12.

The device 10 of FIG. 14 is particularly adapted for "sagless" horizontal use, and includes some "active" hydraulic means. Device 10 is of essentially the same construction as the device of the FIG. 11 embodiment except in the following respects. Is outer frame 12 has fluid cavities 63 and associated compliant elements 64 in confronting relationship to respective ones of the pin members 41. Each chamber 63 is connected via a conduit 71 and adjustable pressure-regulating valve v to a source of pressurized fluid 70, such that the pressure of the fluid within each chamber 63 may be independently adjusted as desired. If inner frame 14 should tend to undergo gravity-induced "sag" or downward displacement relative to outer frame 12, compensation therefor can be readily effected by increasing the pressure of the fluid within the lowermost ones of the fluid chamber 63. By appropriately changing the fluid pressure within chamber 63, it is also possible to adjust the location of the center of compliance longitudinally of the projected central axis of device 10, to accommodate bolts 20 of differing length.

While specific embodiments of the invention have been shown and described, it is to be understood that this was for purposes of illustration only, and not for purposes of limitation, the scope of the invention being in accordance with the following claims.

I claim:

1. In a remote center compliance device for use with a supporting member and a supported member, said device including a primary frame member adapted to be supported by said supporting member, a secondary frame member having support means for supporting said supported member, and interconnecting means interconnecting said primary and secondary members for gross movement of said primary member in unison with said secondary member and for limited adjustive movement of said secondary member relative to said primary member, the improvement comprising:

said interconnecting means including a plurality of extensible and retractable positioning members carried by said secondary frame member and projecting from a plurality of sides thereof into engagement with said primary frame member, each of sides of said secondary frame member having first and second ones of said positioning members projecting therefrom at spaced locations thereon;

a plurality of fluid circuit means, each interconnecting a therewith associated one of said first positioning members upon one side of said secondary support member and a therewith associated non-aligned one of said second positioning members upon another side of said secondary member, for effecting extension of either of said members in response to retraction of the other of said members.

2. A device as in claim 1, wherein each of said first and second positioning members associated with each of said circuit means has a surface exposed to the hydraulic fluid within said circuit means, the area of said surface of said first positioning member being different from the area of said surface of said second positioning member whereby said extension undergone by either of said members in response to said retraction of said other of said members differs in extent from said retraction.

3. A device as in claim 1, wherein said one and said another sides of said secondary frame member are opposite each other, and said first and second positioning members are located approximately centrally of one dimension of the respective one of said secondary frame member sides from which said positioning members project.

4. A device as in claim 3, wherein said first and second positioning members projecting from said one side of said secondary frame member are substantially aligned with respective ones of said first and second positioning members upon the opposite side of said secondary frame member.

5. A device as in claim 1, wherein said positioning members are slidably movable with respect to said primary and secondary frame members.

6. A device as in claim 1, wherein said positioning members are slidably movable relative to said primary frame member.

7. A device as in claim 1, wherein each of said positioning members includes a resilient flexible elastomeric element exposed to the fluid pressure within the therewith associated one of said fluid circuit means.

8. A device as in claim 1, wherein said interconnecting means further includes at least one compliant member connected to said frame members.

9. A device as in claim 1, and further including compliant means between the main body of said secondary frame member and said support means.

10. A device as in claim 1, and further including compliant means associated with said fluid circuit means for varying the compliance thereof.

11. A device as in claim 10, and further including adjustable means engageable with said compliant means for varying the compliance thereof.

12. A device as in claim 1, and further including other fluid circuit means within said primary frame member.

13. A remote center compliance device for use with a supporting member and a supported member, comprising:

a primary frame member adapted to be supported by said supporting member;

a secondary frame member having support means for supporting said supported member;

interconnecting means interconnecting said primary and secondary frame members for gross movement of said secondary frame member in unison with said primary frame member and for limited adjustive movement of said secondary frame member relative to said primary member in response to movement of said supported member;

said interconnecting means including first extensible and retractable positioning members and second extensible and retractable positioning members extending between said first and second frame members at opposite sides thereof, said first positioning members being spaced in the length direction of said frame members from said second positioning members;

a plurality of passive fluid circuits each interconnecting a therewith associated one of said first positioning members and a therewith associated one of said second positioning members.

* * * * *